(12) United States Patent
Davis (10) Patent No.: US 7,175,372 B2
(45) Date of Patent: Feb. 13, 2007

(54) QUICK RELEASE ARBOR

(76) Inventor: John D. Davis, 7633 Raven Hills Dr., Las Vegas, NV (US) 89149

( * ) Notice: Subject to any disclaimer, the term of this patent is extended or adjusted under 35 U.S.C. 154(b) by 35 days.

(21) Appl. No.: 11/022,417

(22) Filed: Dec. 23, 2004

(65) Prior Publication Data

US 2006/0140733 A1 Jun. 29, 2006

(51) Int. Cl.
*B23B 51/04* (2006.01)
(52) U.S. Cl. ..................... 408/204; 408/703
(58) Field of Classification Search ............. 408/204, 408/207, 238, 239 R, 703
See application file for complete search history.

(56) References Cited

U.S. PATENT DOCUMENTS

| | | | | |
|---|---|---|---|---|
| 2,779,361 | A * | 1/1957 | McKiff | 408/204 |
| 3,267,975 | A * | 8/1966 | Enders | 408/200 |
| 3,647,310 | A * | 3/1972 | Morse | 408/239 R |
| 3,880,546 | A * | 4/1975 | Segal | 408/204 |
| 3,973,862 | A * | 8/1976 | Segal | 408/204 |
| 5,076,741 | A * | 12/1991 | Littlehorn | 408/68 |
| 5,246,317 | A * | 9/1993 | Koetsch et al. | 408/204 |
| 5,651,646 | A * | 7/1997 | Banke et al. | 408/204 |
| 5,658,102 | A * | 8/1997 | Gale | 408/1 R |
| 5,967,709 | A * | 10/1999 | Thuesen | 408/204 |
| 6,120,221 | A * | 9/2000 | Alm | 408/204 |
| 6,357,973 | B2 * | 3/2002 | Chao | 408/204 |
| 6,705,807 | B1 * | 3/2004 | Rudolph et al. | 408/1 R |
| 7,001,119 | B2 * | 2/2006 | Wendzina et al. | 408/204 |

* cited by examiner

*Primary Examiner*—Monica Carter
*Assistant Examiner*—Ali Abdelwahed
(74) *Attorney, Agent, or Firm*—Johannes Schneeberger (57) ABSTRACT

An arbor system includes an arbor, a clamp body of a power tool, a tightening feature and an optional snap feature. The arbor has a flanging feature, a thread and a number of circumferentially arranged driving pins. The clamp body is sandwiched between the arbor and tightening feature in a pressed contact with the flanging feature defining a releasable fix that is fully form fitting. Operational tilt and load torque are transmitted without affecting the tight-screwed interlocking between thread and tightening feature. A snap feature, in the form of a spring pin or a spring tongue of a sandwiched washer, may secure the tightening feature against inadvertent unscrewing. The snap feature and snap serrations may be configured as a ratchet such that the snap feature needs only be actuated during unscrewing of the tightening feature.

13 Claims, 12 Drawing Sheets

QUICK RELEASE ARBOR

CROSS REFERENCE

Incorporated by reference are the cross referenced U.S. Pat. No. 6,857,831; the Design Application titled "Hole Saw Multiple Spoke Wheel Body", filed Feb. 26, 2004, application Ser. No. 29/200,502; and the concurrently filed Continuation in Part Application titled "I-Joist Hole Cutting Apparatus", all applications of the same above inventor.

FIELD OF INVENTION

The present invention relates to arbor systems for rotary actuated and axially operating power tools. Particularly, the present invention relates to quick release arbor systems for hole cutting saws.

BACKGROUND

Increasing use of wood and wood like structures in the field of architectural constructions creates a demand for specialized hole saws to cut holes for plumbing, piping and the like at the construction site. Special hole saws such as the cross referenced I-joist Hole Cutting Apparatus are invented to provide for on site fabrication of ever increasing hole diameters with common handheld power drills. The wheel like body of the I-joist Hole Cutting Apparatus has a solid rim that provides a relatively large momentum of inertia reducing the risk of sudden tool locking, which eventually causes the power drill to be ripped out of the operator's hands. The large momentum of inertia in turn causes relatively large gyroscopic forces opposing a tilting or wobbling of the rotating power tool.

To reduce the operational torque necessary to cut large diameter holes, the I-joist Hole Cut Apparatus may be moved in a slight wobble movement around the pilot drill's centering hole. The peripherally rotating cutting blades thereby engage only partially in the cutting groove. This results on one hand in reduced friction between cutting blades and the side walls of the cutting groove and on the other hand in increased cutting pressure at the bottom of the cutting groove. Cutting pressure is ideally brought to a feasible maximum to increase the rate of chip removal. Unfortunately this causes, in combination with the wobble movement and the gyroscopic forces, a significant tilt torque that needs to be communicated between the power drill and the power tool.

Hole saw bodies commonly provide a radial structural connection between the peripheral cutting elements and the central arbor, which in turn is chucked in a power drill. The central arbor needs to be made from high strength material such as steel or steel alloy to match the mechanical properties of the power drill's chuck, to keep wear to a minimum and to withstand operational load torque and eventual tilt torque. The hole saw body has features that correspond with the arbor features to define an arbor system in which various diameter hole saw bodies are alternately connected with the arbor, without removing the arbor from the chuck. As hole saw diameters increase, material and fabrication costs of the hole saw body force the industry to select inexpensive low strength materials and fabrication techniques. This in turn increases discrepancies of mechanical properties of arbor and hole saw body.

Prior art arbor systems commonly provide a connection between hole saw body and arbor via a central thread hole screwed onto a thread bolt of the arbor. The hole saw is operated in accordance with the thread orientation such that the torque transmitted via the chuck and the arbor causes the thread to tighten. To remove the power tool from the arbor, tool and arbor need to be rotated with respect to each other in direction opposite the operating torque. This requires usually additional hand tools to engage with the arbor and the power tool. Debris in the thread interlock, excessive operational torque eventually resulting from sudden tool locking and/or eventual corrosion in the thread interlock may cause thread locking. Thread locking may render a removal of the power tool from the arbor difficult if not impossible with conventional means.

The problem of thread locking has been addressed in the prior art by transmitting the operational torque via additional interlocking features such as driving pins that extend from the arbor commonly in an axial direction at an offset from the central thread bolt. The power tool features pin holes at an offset corresponding to that of the driving pins such that after screwing on of the power tool to the arbor, the driving pins may be aligned with corresponding pin holes at certain orientations of the power tool relative to the arbor. In the prior art arbor systems, the driving pins are commonly held axially moveable and circumferentially rigid with respect to the arbor's thread bolt and may be engaged with the pin holes once aligned with each other. Because the driving pins transmit the operational load torque from the arbor via the pin holes onto the power tool, the central thread connection remains relatively lose irrespective of the operational torque. Disassembly of the power tool is therefore easily accomplished by axially removing the driving pins from the driving holes, followed by unscrewing the central thread connection.

A significant shortcoming of prior art arbors, having axially moveable driving pins and a central thread connection, is that due to the defined circumferential orientation between the arbor and the power tool and necessary tolerances between arbor and power tool, the assembled power tool remains loosely attached to the arbor's thread bolt. This prevents precise control of the power tool. More importantly, the above described tilting torque that may need to be transmitted onto the power tool via the thread connection is very limited due to the loose interlocking of both threads.

Construction workers operate tools in a rough and fast paced manner. Exchanging hole saws may likely be performed without verification of a proper tightening of the tightening features and eventually even without use of tightening tools. A reliable arbor system may need a snap feature to prevent inadvertent loosening between the arbor and the hole saw during operation. Prior art quick release arbor systems utilize a number of relatively intricate elements to provide snap in and/or ratchet features that may be sensitive to debris, rough handling and that may be difficult to maintain and replace.

For the reasons presented above, there exists a need for an arbor system that on one hand provides easy assembly and disassembly unaffected by the operationally transmitted torque. On the other hand an arbor system is needed with fully defined and rigid connection between the arbor and the power tool. The thread connection is thereby needed to remain substantially unaffected by tilting torque and/or operational load torque. The present invention addresses these needs.

Further more, there also exists a need for an arbor system that provides a reliable form fitting of mechanically highly dissimilar materials of arbor and hole saw body. The present invention addresses this need as well.

Also, there exists a need for a quick release arbor system that provides a simple, robust and easily replaceable snap feature to prevent unintentional loosening during hole saw operation. The present invention addresses also this need.

SUMMARY

A releasable arbor system connects a chucked arbor to an axially operating power tool that operationally rotates around a rotation axis. The arbor system includes an arbor, a clamp body of the power tool, a tightening feature and an optional snap feature. The arbor has an arbor flanging feature and a first thread axially extending along the rotation axis. The arbor further includes at least one but preferably three driving pins extending from the arbor flanging feature at an offset to the rotation axis.

The clamp body has a core with a tool flanging feature correspondingly shaped with the arbor flanging feature. The clamp body also features a pin hole for axially engaging with the arbor's driving pin, a clamp face opposite the tool flanging feature and a core shaft extending through the core axially along the rotation axis and aligned with the first thread.

The tightening feature has a second thread corresponding to the first thread and a tightening face corresponding to the clamp face. While at least one of the first thread and the second thread extends through the core shaft and while the first thread and the second thread are tight-screwed interlocking, a pressed contact is established either between the flanging features together with the driving pin and pin hole or between at least three driving pins and three pin holes.

The pressed contact provides a releasable fix that is axially, radially and circumferentially form fitting such that the tight-screwed interlocking remains substantially unaffected of operational tilt torque and operational load torque.

The arbor may be a monolithic structure, preferably made of a high strength metal such as steel or steel alloy. The clamp body may also be a monolithic structure, preferably made of a light metal such as aluminum, aluminum alloy, and the like. The clamp body may also be made of plastic.

The first thread may be an outside thread of a thread bolt and the tightening feature may be a nut with the second thread being an internal thread. The first thread may alternately be an internal thread and the tightening feature may be a screw with the second thread being an outside thread.

The arbor flanging feature may include an arbor stud correspondingly shaped to the core shaft, both providing the radial form fitting. The arbor flanging feature may further include an arbor face facing substantially axially with respect to the rotation axis. In that case, the clamp flanging feature has a flange face correspondingly shaped to the arbor face, both providing the axial form fitting. The arbor flanging feature may alternately be provided by at least three driving pins and at least three pin holes, both preferably conical for a snug engaging, irrespective of fabrication tolerances and/or adverse operation influences such as debris deposits and/or corrosion. Driving pins and holes may be circumferentially arrayed with respect to the rotation axis.

The tightening feature may have a profiled circumference for tool assisted actuation. The tightening feature may also have a snap serration interacting with a circumferentially rigid snap feature having an engaging position and a releasing position. At least during the tight-screwed interlocking, the engaging position is established by snap interlocking of the snap feature in the snap serration. The tightening feature is consequently prevented at least from unscrewing off the thread bolt. During the releasing position, the snap feature disengages the snap serration for intentional unscrewing the tightening feature.

The snap feature is preferably held by a spring load in the engaging position and is movable against the spring load into the releasing position. The snap feature may be a spring loaded snap pin slidable along a snap axis. The snap axis may be parallel to the rotation axis. The snap pin may be guided within at least one driving pin extending through the clamp body. The driving pin, snap serration and snap axis may be positioned with respect to an outside circumference of the tightening feature such that the driving pin is accessible for moving to and holding in the releasing position while the profiled circumference is circumferentially actuated by either a tightening feature tool or by hand. The snap serration may be an integral part of the outside circumference.

The snap feature may also be a resiliently suspended snap tongue having a suspended end and a free end with a snap profile correspondingly shaped and positioned with respect to the snap serration for snap interlocking with the snap serration. The snap tongue may be part of a washer sandwiched between the clamp body and the tightening feature. The washer may have a pin fit corresponding and interlocking with the driving pin extending through and above the clamp body's pin hole such that the washer is at least circumferentially rigid with respect to the arbor.

The snap serration may have a sliding face configured to force the snap feature into the releasing position while the tightening feature is rotated in a free rotation direction, which is preferably a tightening direction in which the nut is screwed on the first thread towards the clamp body.

The snap tongue may be suspended inward and tangential such that the snap tongue operates in conjunction with the snap serration as a ratchet. The ratchet provides the free rotation direction and a locking rotation direction.

The power tool is preferably a hole saw. The arbor system provides a simple and reliable attachment and quick release of varying size hole saws while the arbor preferably remains chucked in a power drill.

DETAILED DESCRIPTION

Figure 1:
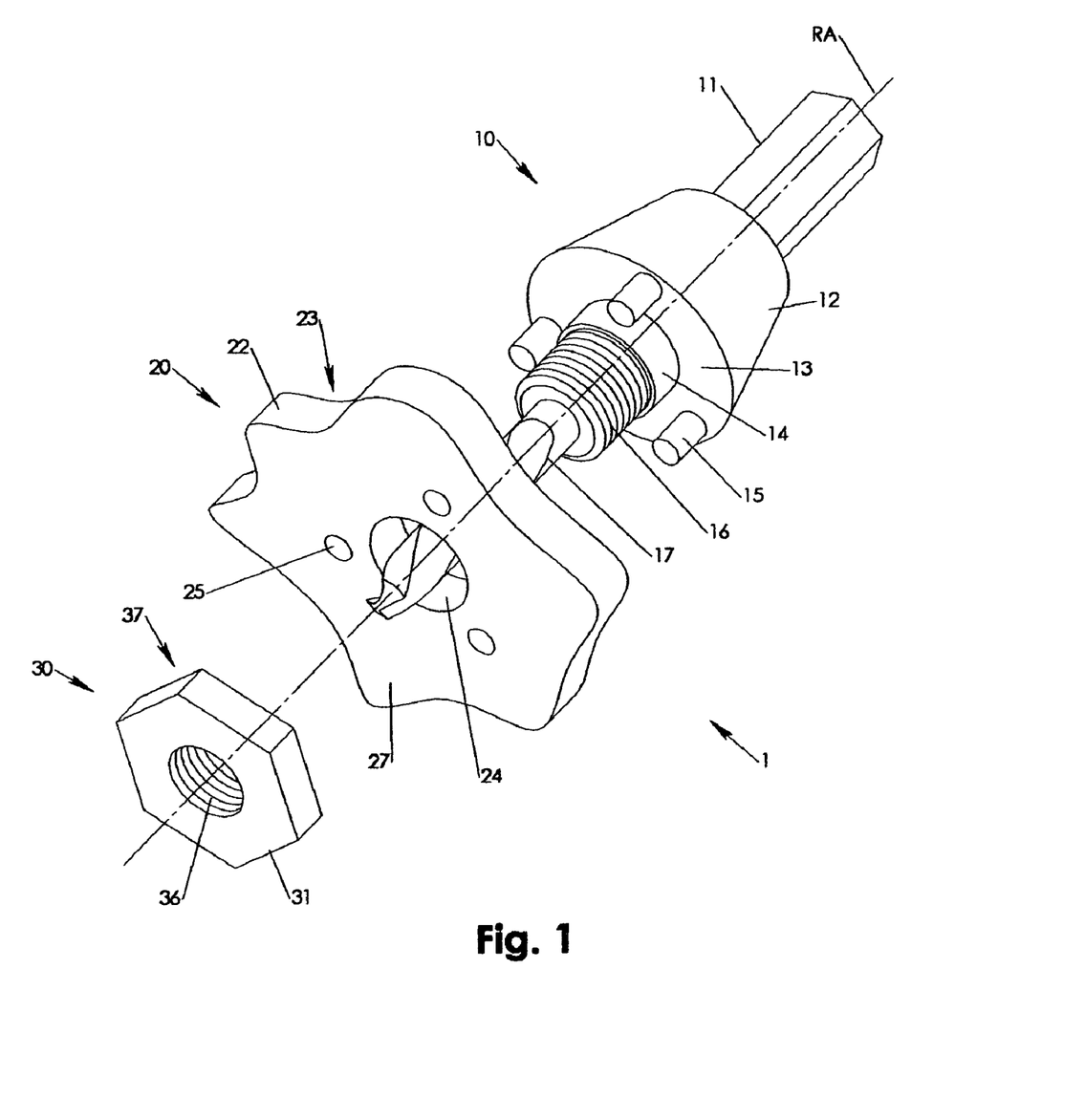
FIG. 1 is a first perspective exploded view of the arbor system according to a first embodiment of the invention.
Figure 2:
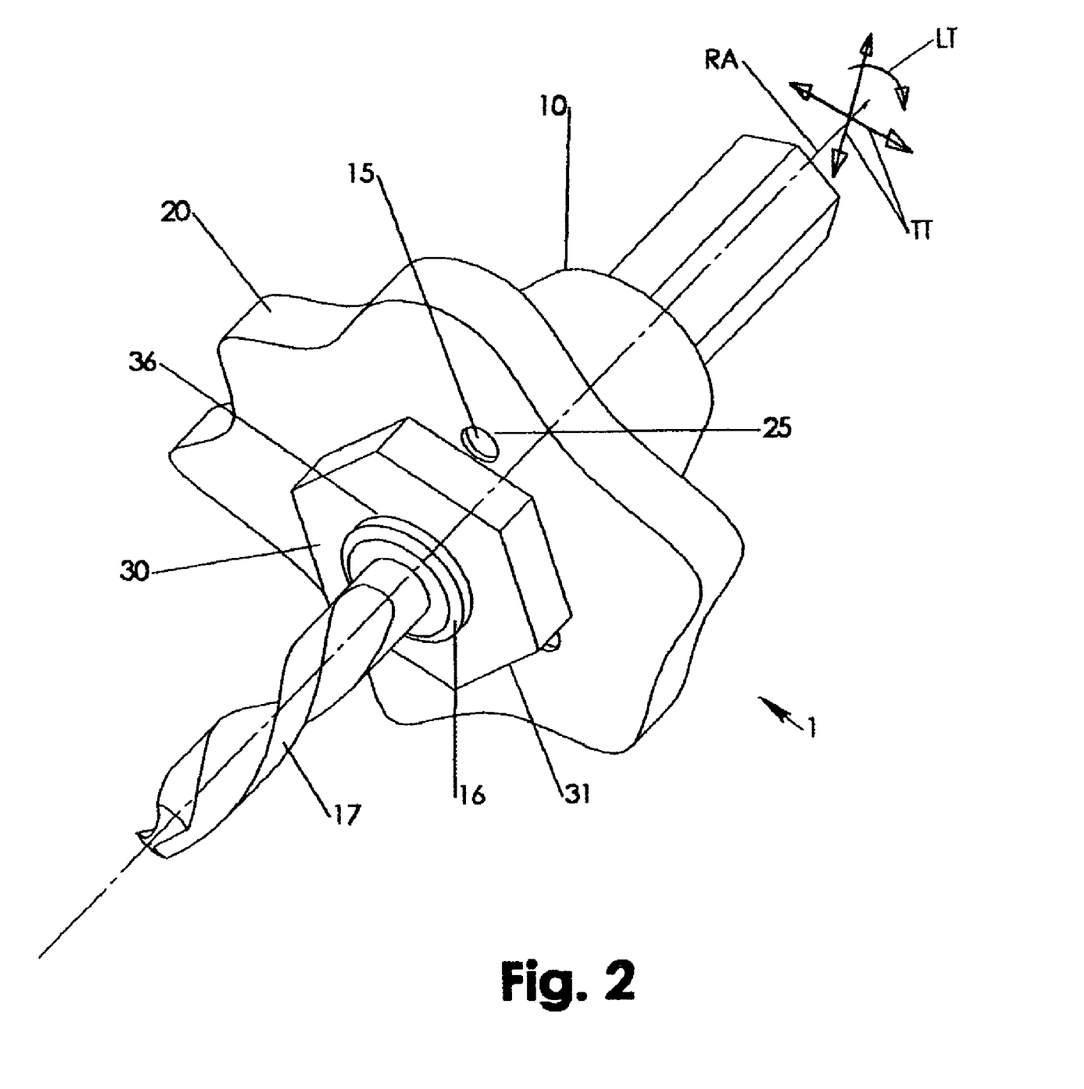
FIG. 2 is the first perspective view of the assembled arbor system of FIG. 1.

As in FIGS. 1 and 2, an arbor system 1 includes an arbor 10, a clamp body 20 and a tightening feature 30. The arbor 10 has an arbor body 12 having an arbor flanging feature, which includes according to a first embodiment an arbor face 13 and an arbor stud 14. From the arbor stud 14 extends a first thread 16 in the exemplary form of an outside thread of a thread bolt. The first thread 16 extends at least axially with respect to a rotation axis RA. Arbor stud 14 and first thread 16 are preferably also concentric with respect to the rotation axis RA. At least one but preferably three driving pins 15 extend from the arbor body 12 in an offset to the rotation axis RA. Opposite the driving pin(s) 15 extends a well known chucking stud 11 for concentrically chucking the arbor 1 with respect to the rotation axis RA in a well known chuck of a power drill or the like. From the arbor body 12 extends a well known pilot drill 17 concentric with respect to the rotation axis RA. The arbor 10 is preferably monolithically fabricated from high strength metal such as steel or steel alloy. While the arbor 1 is chucked in the power drill, the arbor 1 is operationally rotated around the rotation axis RA.

The clamp body 20 may be part of a power tool that preferably operates axially with respect the rotation axis RA. Such a power tool is preferably the cross referenced I-Joist Hole Cutting Apparatus. The clamp body 20 has a core 22 with a core shaft 24 and pin hole(s) 25. Either the first thread 16 or a second thread 36 of a tightening feature 30 extends through the core 22 to screw on and interlock across the core 22. In the exemplary Figures, the first thread 16 as part of the thread bolt extends through core 22, moreover the tightening features 30, 40, 60 are nuts. The clamp body 20 may be monolithically fabricated from light metals such as aluminum, aluminum alloy and the like. The clamp body 20 may also be made of plastic.

The axial, radial and circumferential form fitting provides for low peak stresses in the pressed contact areas and consequently for a combination of arbor material and clamp body material with highly dissimilar mechanical properties. This again contributes advantageously to a cost effective fabrication of a compact arbor 10 from expensive high strength material and at the same time a cost effective fabrication of a voluminous power tool body with integral clamp body 20 of a low cost and/or lightweight material. The arbor systems 1–4 as in the Figures are preferably configured to be chucked in a conventional hand held power drill having a common chucking capacity of up to about ½ inch and to releasable fix a power tool for cutting holes into wood and wood like material with hole diameter of up to about 12 inches.

The pin hole(s) 25 are positioned and shaped for axially engaging with the driving pin(s) 15. On the clamp body's 20 side away from the arbor 10 is a clamp face 27. On the clamp body's 20 side towards the arbor 10 is a flange face 23. Flange face 23 and core shaft 24 may be part of a tool flanging feature correspondingly shaped to the arbor flanging feature. In particular and in reference to FIGS. 1, 2, FIGS. 4–7 and FIGS. 9–11, the flange face 23 corresponds to arbor face 13 providing an axial form fitting while the clamp body 20 is releasable fixed on the arbor 10. Likewise and also in reference to FIGS. 1,2, FIGS. 4–7 and FIGS. 9–11, the core shaft 24 corresponds to the arbor stud 14 providing a radial form fitting while the clamp body 20 is releasable fixed on the arbor 10. Also in reference to FIGS. 1, 2, FIGS. 4–7 and FIGS. 9–11, the engaging of the driving pin(s) 15 in corresponding pin hole(s) 25 provides a circumferential form fitting while the clamp body 20 is releasable fixed on the arbor 10. Tolerances and eventual gaps between driving pin(s) 15 and pin hole(s) 25 may be selected sufficiently large that radial form fitting between arbor shaft 14 and shaft fit 24 are not compromised. An operational torque received by the arbor 1 from the power drill, causes the driving pin(s) 15 to circumferentially contact the pin holes 25 such that the operational load torque LT may be coupled onto the clamp body 20 and the power tool. In the case of rotationally symmetric driving pins 15, the operationally forced pin/hole contact may additionally contribute to a radial centering of the clamp body 20 relative to the arbor 10 as may be well appreciated by anyone skilled in the art.

Arbor face 13 and arbor stud 14 may be combined into a first cone. In that case, the flange face 23 and the core shaft 24 may be a second cone correspondingly shaped to the first cone. The pressed contact between the first and the second cone provides simultaneously the axial and the radial form fitting.

The tightening feature 30 has an outside circumference 31, a tightening face 37 and an internal thread 36 with which it may be screwed on and tightened on the first thread 16. The outside circumference 31 may be profiled to engage with and be actuated by a well known nut tool and/or to ergonomically assist a manual actuation.

Figure 3:
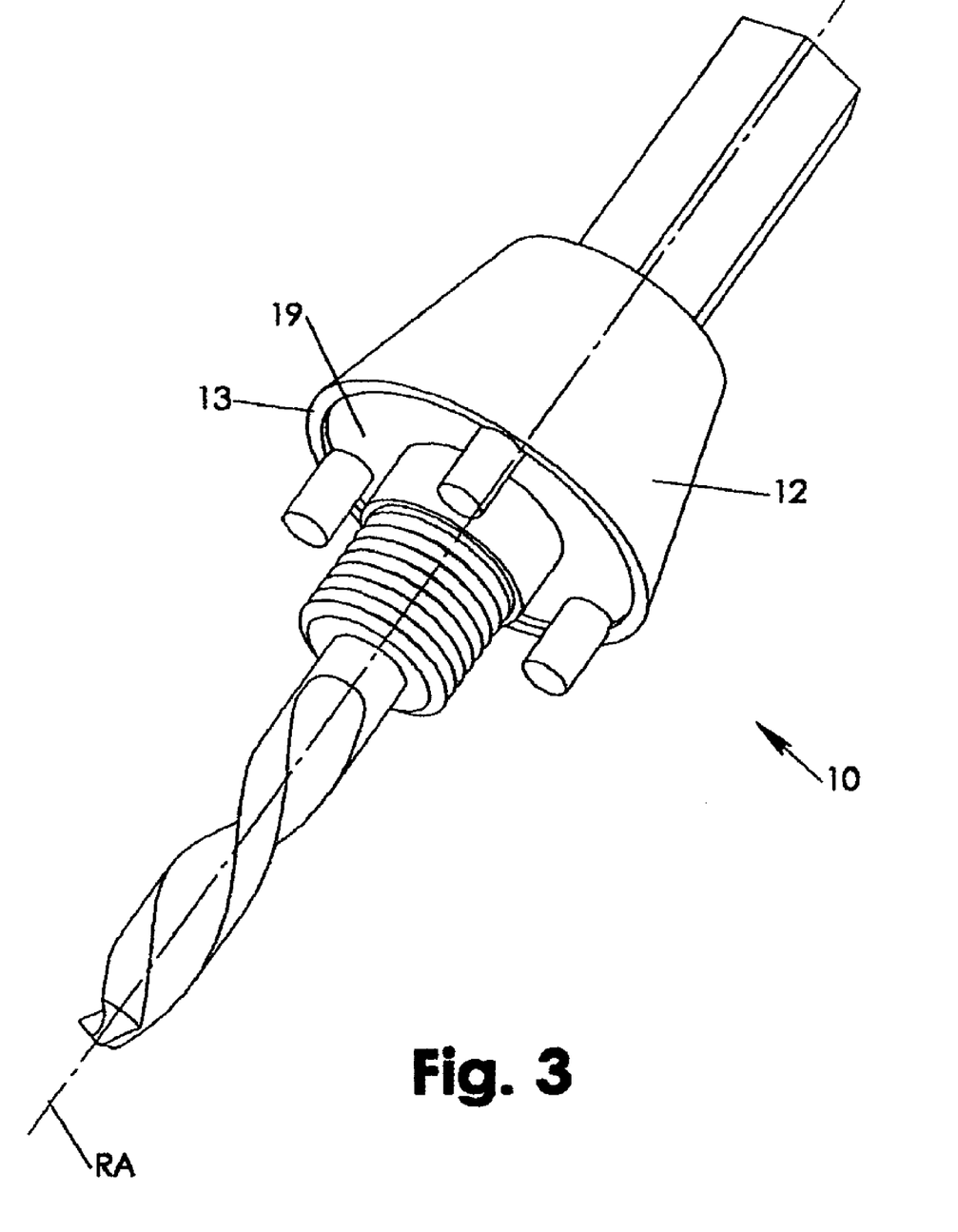
FIG. 3 is the first perspective view of the arbor of the first embodiment having a central recess face.
Figure 4:
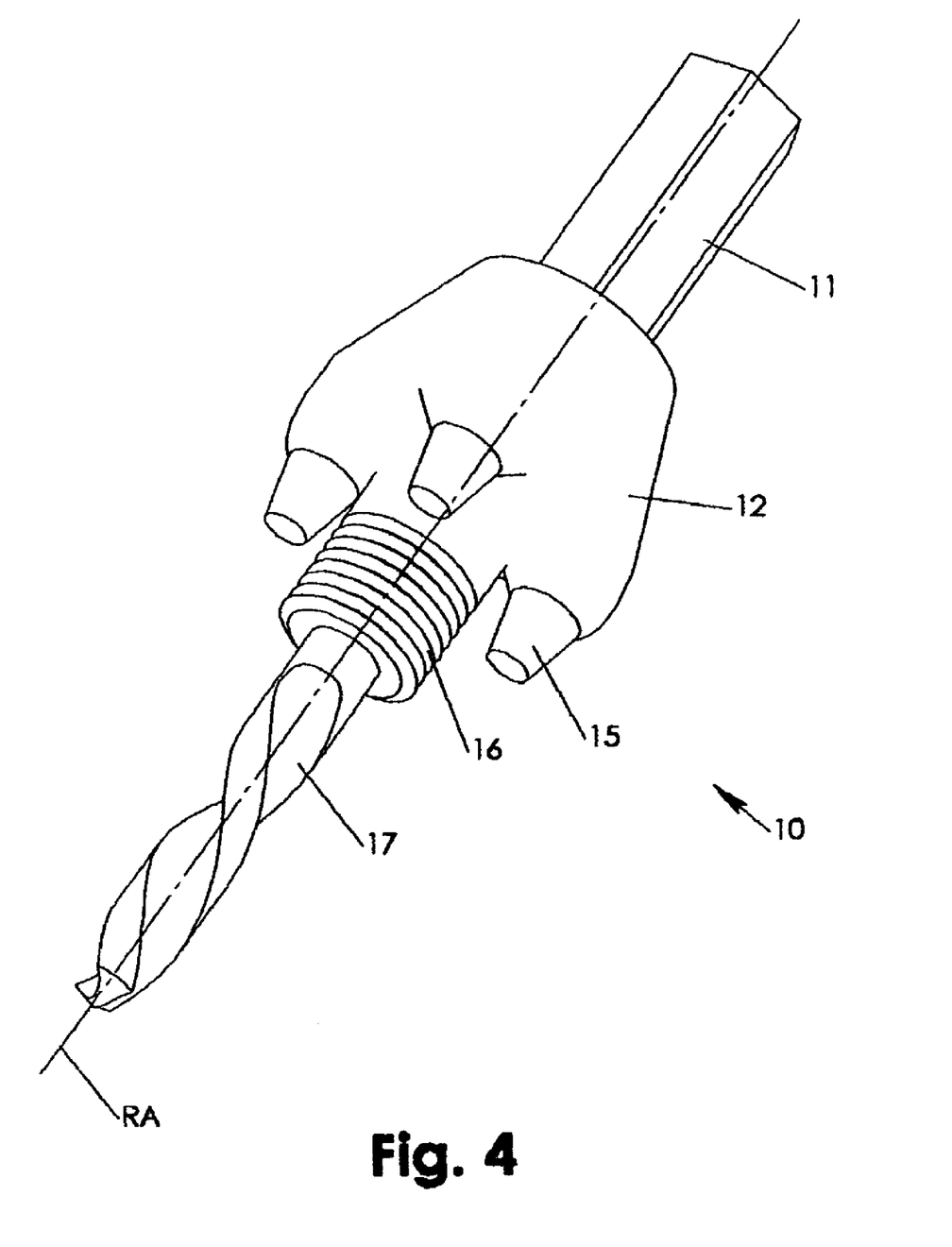
FIG. 4 is the first perspective view of the arbor according to a second embodiment.

During a tight-screwed interlocking of the first thread 16 and the second thread 36, either the arbor flanging feature is in pressed contact with the tool flanging feature, according to FIGS. 1–3, or at least three driving pins 15 are in pressed contact with correspondingly shaped pin holes 25, according to FIG. 4. The pressed contact warrants a releasable fix that is axially, radially and circumferentially form fitting such that the tight-screwed interlocking remains substantially unaffected by an operational tilt torque TT and an operational load torque LT.

The operational tilt torque TT may result from a wobbling motion induced by an operator onto a hand held power drill in the chuck of which the arbor 1 is chucked. The wobbling motion may be induced with respect to a pilot hole drilled with the pilot drill 17 to partially lift the rotating cutting teeth out of the a cutting groove for the purpose of clearing the cutting groove from cutting debris, for reducing cutting friction and/or for reducing contact area between cutting teeth and cut material as may be well appreciated by anyone skilled in the art.

Reducing the cut contact area provides for a cut contact pressure at a level necessary for material removal at a limited feed force. The feed force may be limited by an operator's physical strength. The rotating cutting teeth may be part of the rotating power tool in the preferred configuration of the cross referenced I-joist Hole Cutting Apparatus. The operational load torque LT results from rotating the power tool via the power drill's chuck against a cutting resistance of the power tool's engaging teeth as may be well appreciated by anyone skilled in the art. The wobbling motion contributes substantially for a simple, inexpensive and fast cutting of holes into wood and wood like materials with diameters of 12 inch and above at the construction site by merely utilizing a freely hand held power drill in combination with the I-joist Hole Cutting Apparatus.

Referring to FIG. 3, the arbor flanging feature may have a recess face 19 such that the axial form fitting between arbor face 13 and flange face 23 is ring shaped along the outer circumference of the arbor body 12. As a favorable result, the pressed contact is established primarily along the arbor body's 12 circumference. This again provides for reduced stress peaks from tilt torque TT and for a reduced pressed contact as may be well appreciated by anyone skilled in the art. Consequently, the pressed contact may be established by merely hand tightening the tightening features 30, 40, 60, which greatly simplifies exchange of power tools on the arbor 10. The ring shaped axial form fit may be provided alternately or in combination with the arbor recess face 19 by any well known recess feature fabricated into the core 22.

In FIG. 4, the arbor flanging feature may be omitted and the pressed contact established between at least three driving pins 15 snugly engaging with correspondingly shaped pin holes 25. In that case, the driving pins 15 may be conical to warrant the releasable fix. The driving pins 15 are preferably evenly circumferentially arrayed with respect to the rotation axis RA to evenly distribute the contact pressure, operational pressure from tilt torque TT and operational load torque LT.

FIGS. 5–12 pertain to embodiments that include a circumferentially rigid snap feature 18, 57, 77 having an engaging position and a releasing position. The engaging position is established at least while the tightening feature 40, 60 is tightly screwed on the first thread 16. In the engaging position, the snap feature is snap interlocking in a snap serration of the tightening feature 40, 60 and at least prevents it from unscrewing the first thread 16. In the releasing position, the snap feature 18, 57, 77 disengages the snap serration for unscrewing the tightening feature 40, 60 from the first thread 16. The snap feature is preferably held by a spring load in the engaging position and is movable against the spring load into the releasing position. The spring load may result from a natural resilience of the snap feature 57, 77 or, as in the case of the snap feature 18, from an additional spring member such as a well known coil spring.

Figure 5:
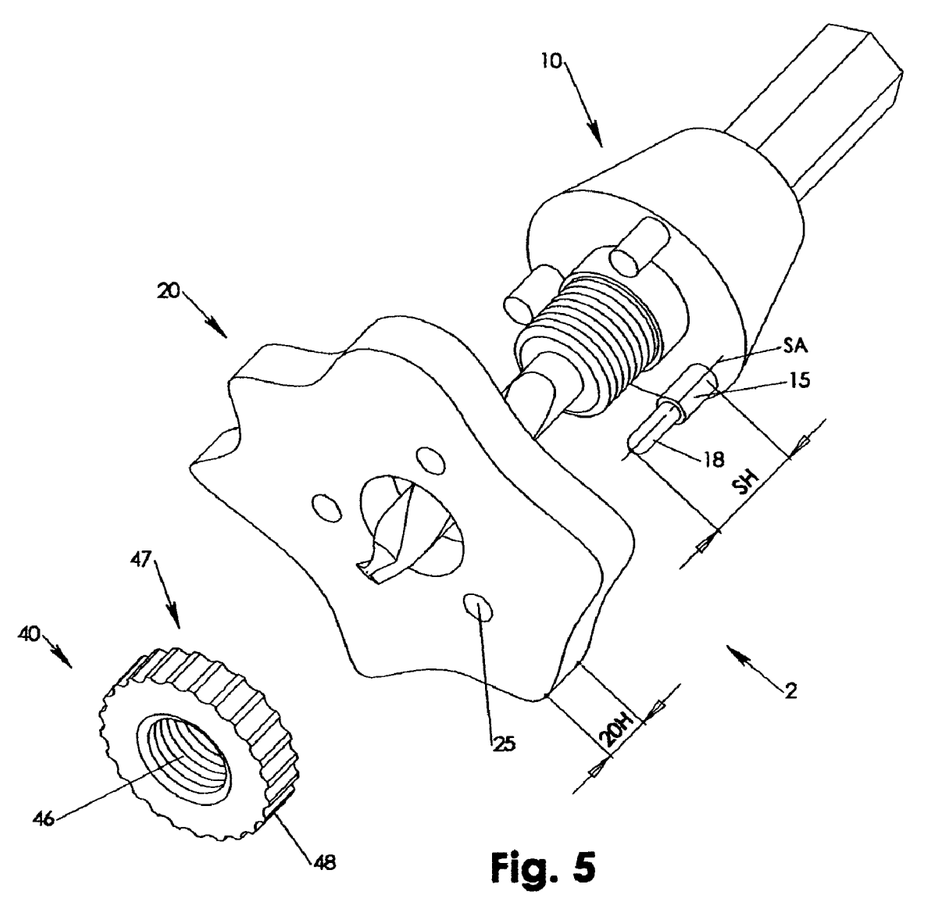
FIG. 5 is the first perspective exploded view of the arbor system according to a third embodiment of the invention.
Figure 6:
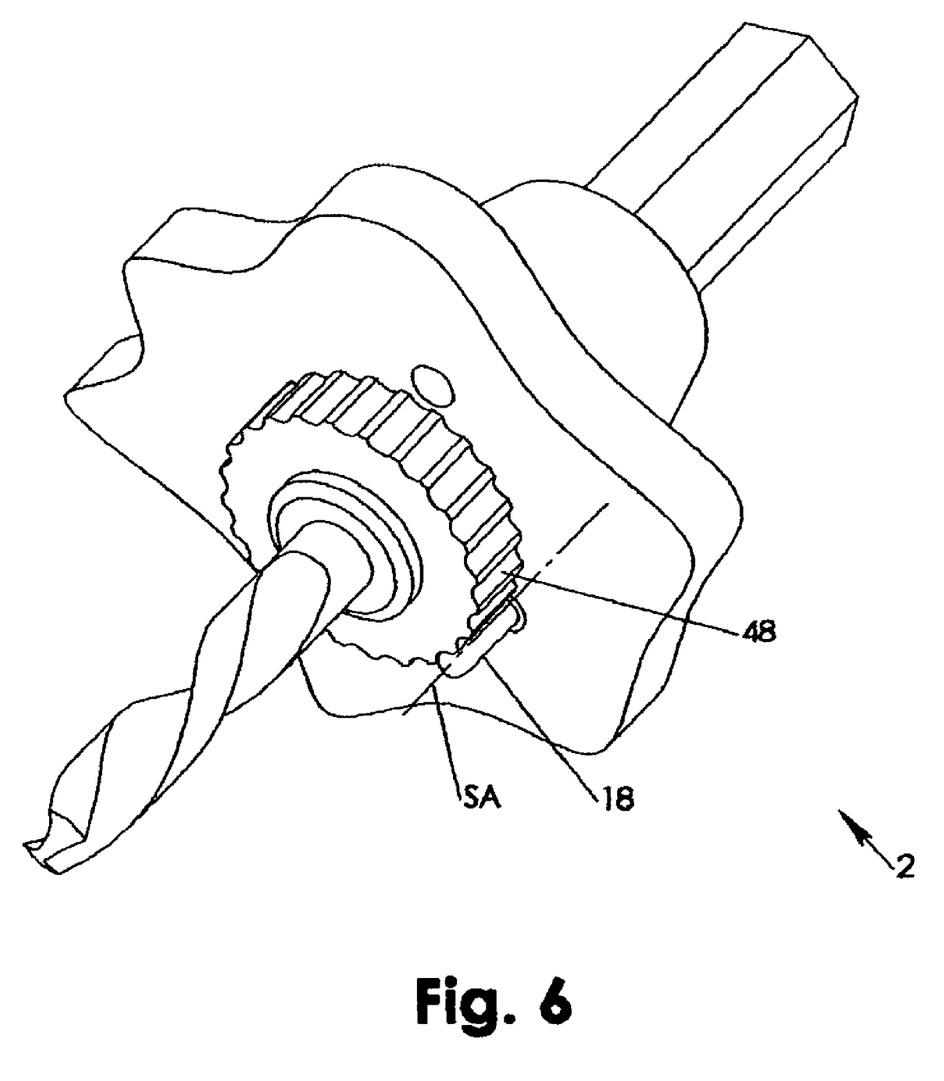
FIG. 6 is the first perspective view of the assembled arbor system of FIG. 5.
Figure 7:
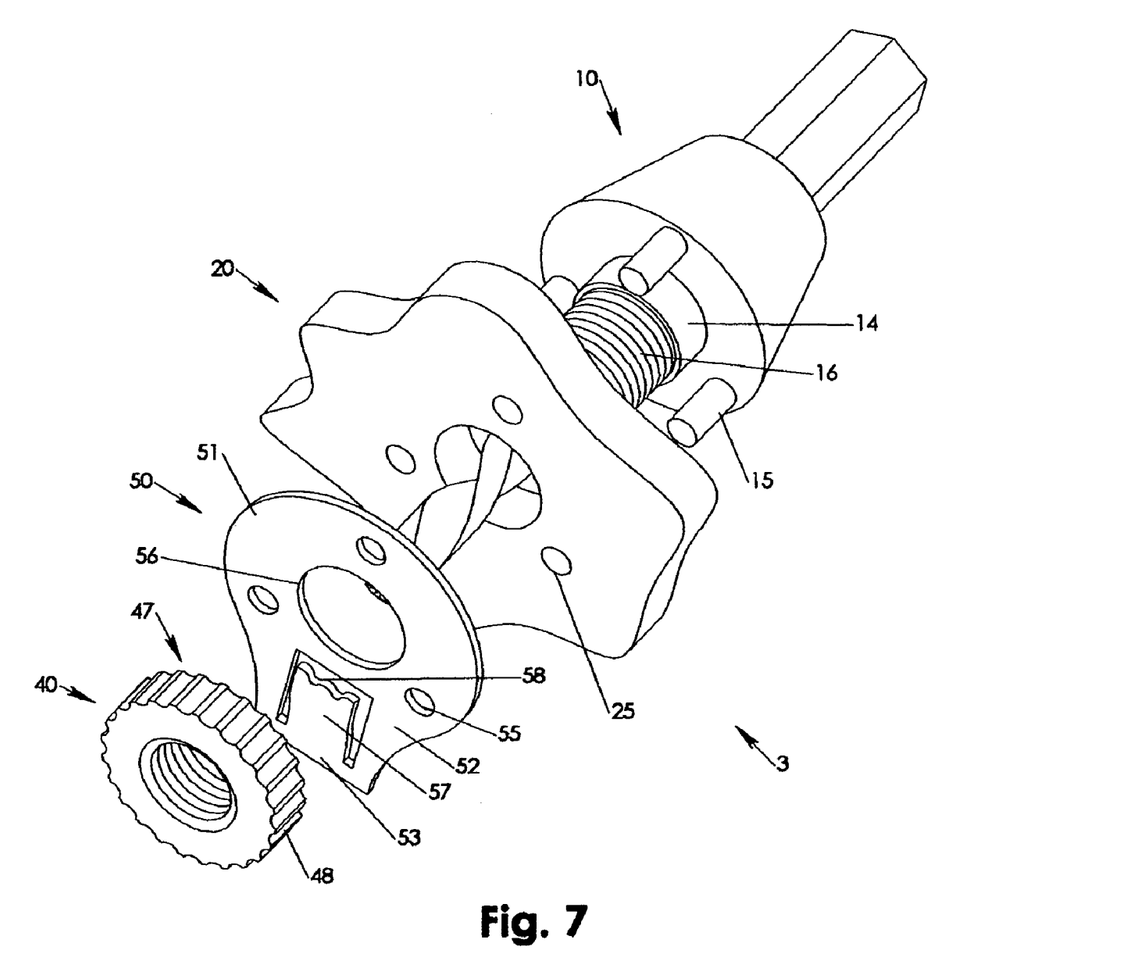
FIG. 7 is the first perspective exploded view of the arbor system according to a fourth embodiment of the invention.
Figure 8:
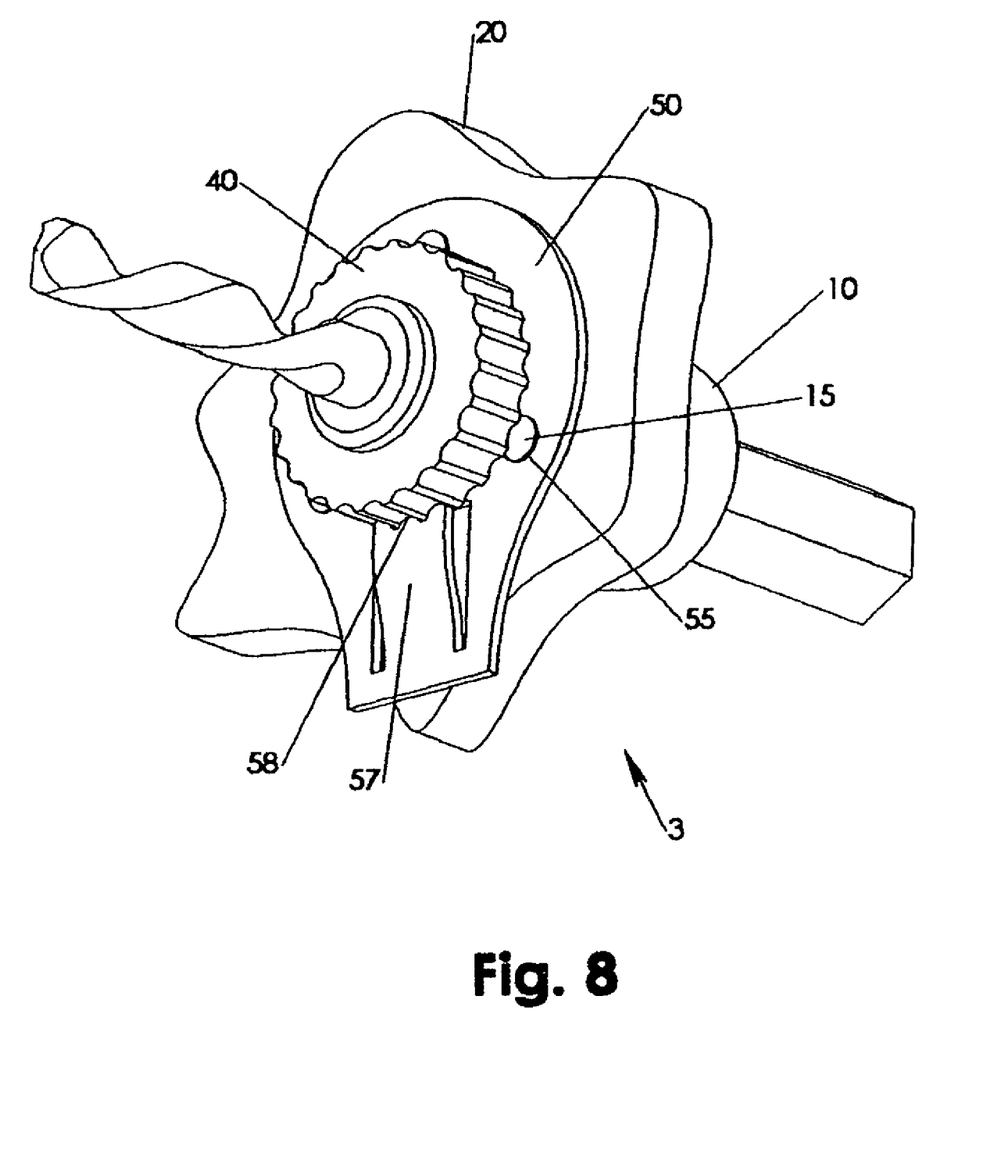
FIG. 8 is a second perspective view of the assembled arbor system of FIG. 7.
Figure 9:
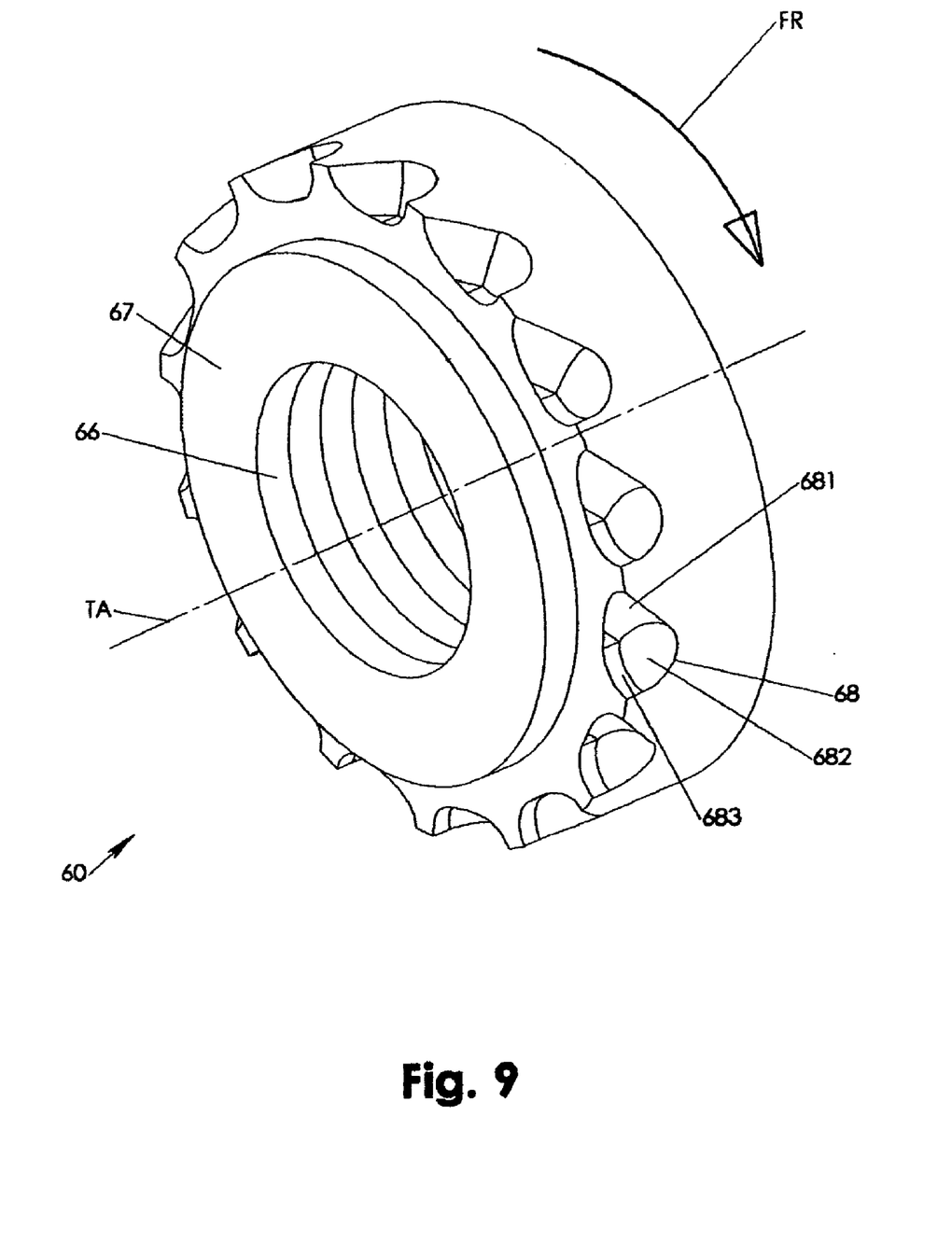
FIG. 9 shows a third perspective view of a nut having serrations with sliding faces.
Figure 10:
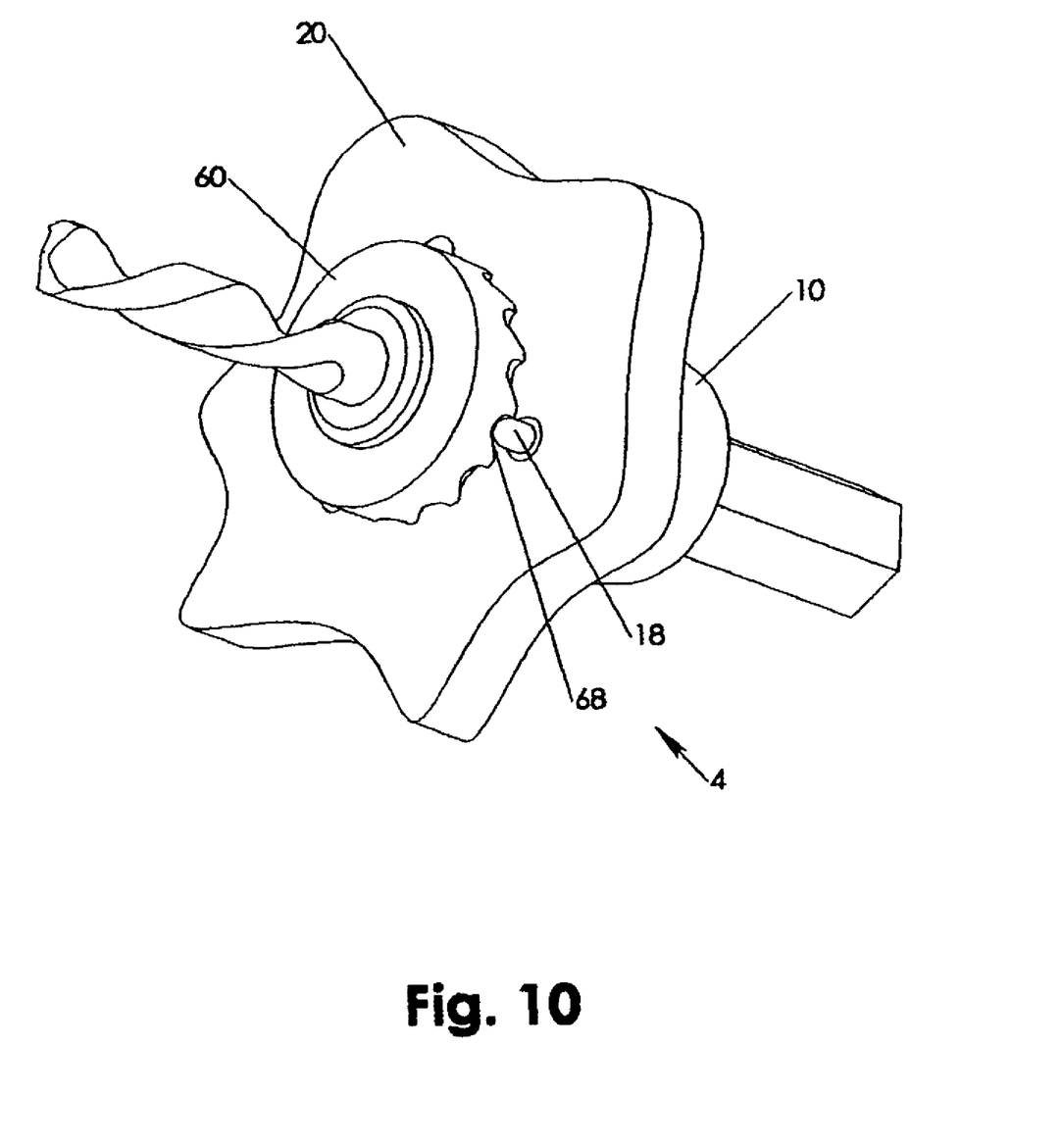
FIG. 10 is the second perspective view of an arbor system including a snap pin and the nut of FIG. 9.

Referring to FIGS. 5, 6 and 10, the arbor system 2, 3 includes the snap feature 18 in the configuration of a snap pin 18. A coil spring or the like may be internally pushing against the snap pin 18. The snap pin 18 is spring loaded and slidable along a snap axis SA, which is preferably parallel to the rotation axis RA. The snap pin 18 is preferably part of the arbor 10 and is guided within at least one of the driving pin(s) 15, which interlocks with a pin hole 25 extending through the core 22. The snap pin 18 has a natural snap height SH larger than a flange height 20H such that it extends through the clamp body 20 and snap interlocks with a snap serration 48, 68 at least while the serration nut 40 is tightly screwed on the first thread 16. The snap interlocking is preferably spring loaded. The snap pin 18, the snap serration 48, 68 and the snap axis SA are preferably positioned with respect to an outside circumference of the tightening feature 40, 60 such that the snap pin 18 is accessible for being moved into and held in the releasing position while the outside circumference of the tightening feature 40, 60 is circumferentially actuated either manually or by a well known tightening feature tool. The snap serration is preferably an integral part of the outside circumference.

In FIGS. 7, 8 and 11, 12, the snap feature is a resiliently suspended snap tongue 57, 77 along the free end of which a snap profile 58, 78 is correspondingly shaped and positioned with respect to the snap serrations 48, 68. The snap tongue 57, 77 is naturally in the engaging position and snap interlocking with the snap serration 48, 68. The snap tongue 57, 77 may be forced into the releasing position. The snap tongue 57, 77 may be part of a washer 50, 70 sandwiched between the clamp body 20 and the tightening feature 40, 60. The washer 50, 70 may be positioned at least circumferentially rigid by a driving pin 15 extending through and above the corresponding pin hole 25 and interlocking with a corresponding pin fit 55, 75 of the washer 50, 70.

Referring to FIGS. 9–12, the snap serration 68 may have a sliding face 681 configured for forcing the snap feature 18, 57, 77 into the releasing position while the tightening feature 60 is rotated in a free rotation direction FR. The free rotation direction FR is preferably the direction in which the tightening feature 60 is screwed on. A number of snap serrations 68 may be placed along the outer circumference of the tightening feature 60 and rotationally symmetric with respect to the tightening axis TA, which is the center axis for the second thread 66. The tightening axis TA preferably coincides with the rotation axis RA. The snap serration 60 may also have a resting face 682 and a stopping face 683 against which the snap feature 18, 57, 77 presses with spring load. The stopping face 683 is configured to inhibit inadvertent movement of the tightening feature 40, 60 out of the engaging position.

Figure 11:
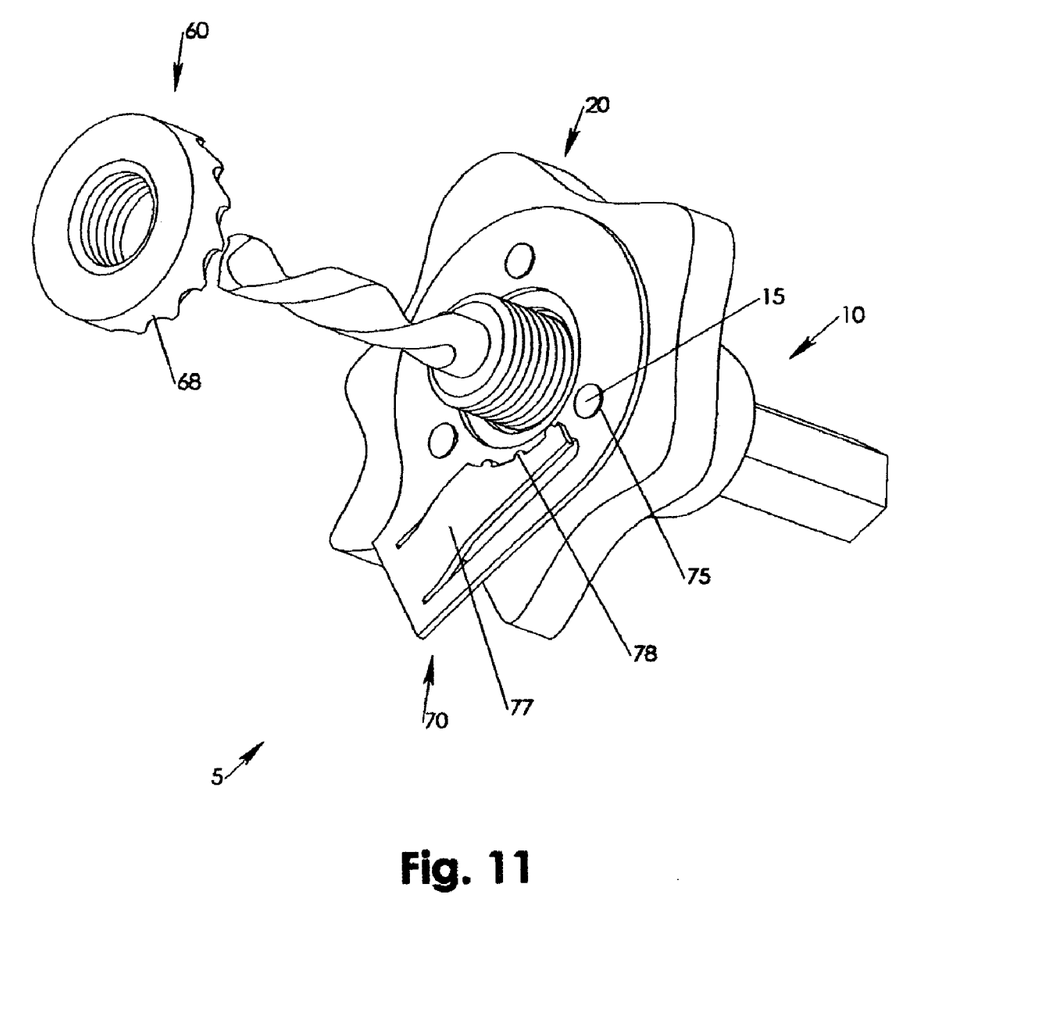
FIG. 11 is the second perspective view of an arbor system with a ratchet tongue washer and the nut of FIG. 9 shown in disassembled spacing.
Figure 12:
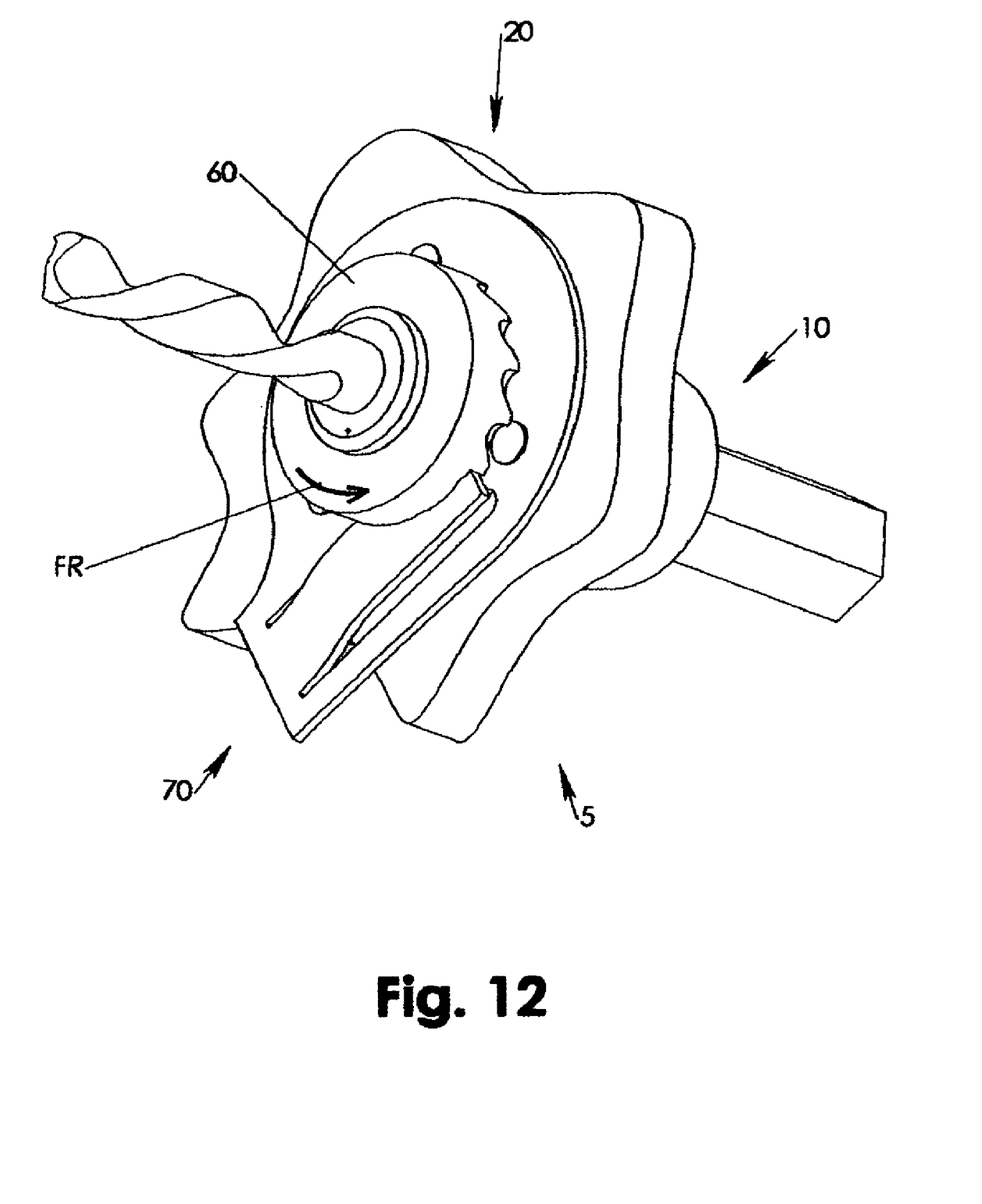
FIG. 12 is the arbor system of FIG. 11 with the nut of FIG. 9 in assembled position.

According to FIGS. 11, 12, the snap tongue 77 is configured to additionally assist the ratchet operation of the snap serration(s) 68. The snap tongue 77 extends substantially inward and tangential with respect to the rotation path of the snap serration 48, 68. The ratchet has a free rotation direction FR and an opposite locking rotation direction.

To provide a maximum of interlocking threads while keeping the height of the tightening feature 30, 40, 60 and/or the eventual thread bolt to a minimum above the clamp face 27, the arbor stud 14 may be substituted by a similarly operating cylindrical protrusion axially protruding off the tightening face 37, 47, 67. in case of a thread bolt, the first thread 16 in the configuration of an outside thread may extend all the way to the arbor face 13 providing more threads for the tightening feature to engage 30, 40, 60 with. While the tightening feature 30, 40, 60 is tightened, the cylindrical protrusion centers within the core shaft 24 contributes to the radial form fitting. In case of the first thread 16 being an internal thread, the arbor stud 14 may be substituted by an arbor shaft inward extending from the arbor face 13 followed by the first thread 16. The cylindrical protrusion may thereby simultaneously center in the core shaft 24 and the arbor shaft while the tightening feature 30, 40, 60 is in the tight-screwed interlocking with the arbor 10.

Accordingly, the scope of the invention described in the specification above is set forth by the following claims and their legal equivalent.

What is claimed is:

1. A releasable arbor system for connecting an axially operating tool to a chucked arbor operationally rotating around a rotation axis, said arbor system comprising:
   a. an arbor including:
      i. an arbor flanging feature;
      ii. a first thread axially extending along said rotation axis;
      iii. a driving pin extending from said arbor flanging feature in an offset to said rotation axis;
   b. a clamp body of said axially operating tool, said clamp body including:
      i. a core;
      ii. a tool flanging feature correspondingly shaped to said arbor flanging feature and part of said core;
      iii. a pin hole for axially engaging with said driving pin;
      iv. a clamp face fabricated into said core opposite said tool flanging feature;

v. a core shaft extending through said core axially along said rotation axis and aligned with said first thread;

c. a tightening feature including:
  i. a second thread corresponding to said first thread;
  ii. a tightening face correspondingly shaped to said clamp face; wherein while at least one of said first thread and said second thread is extending through said core shaft and while said first thread and said second thread being in a tight-screwed interlocking a pressed contact is established between at least one of:
    I. said tool flanging feature and said arbor flanging feature and
    II. at least three of said pin hole and at least three of said driving pin;

d. a circumferentially rigid snap feature having an engaging position and a releasing position, wherein at least during said tight-screwed interlocking said engaging position is established in which said snap feature is snap interlocking in a snap serration of said tightening feature such that said tightening feature is prevented at least from unscrewing said first thread, and wherein during said releasing position said snap feature disengages said snap serration for unscrewing said tightening feature from said first thread; and wherein said pressed contact provides a releasable fix that is axially, radially and circumferentially form fitting such that said tight-screwed interlocking remains substantially unaffected of an operational tilt torque and substantially unaffected by an operational load torque.

2. The arbor system of claim 1, wherein said snap feature is held by a spring load in said engaging position and is movable against said spring load into said releasing position.

3. The arbor system of claim 1, wherein said snap feature is a snap pin spring loaded slidable along a snap axis.

4. The arbor system of claim 3, wherein said snap axis is parallel to said rotation axis.

5. The arbor system of claim 3, wherein said snap pin is part of said arbor and is guided within at least one of said driving pin and wherein at least one of said pin hole is a through hole through which such snap pin extends through said clamp body and said snap interlocks with said snap serration.

6. The arbor system of claim 3, wherein said snap pin, said snap serration and said snap axis are positioned with respect to an outside circumference of said tightening feature such that said snap pin is accessible for moving into and holding in said releasing position while said tightening feature is circumferentially actuated by at least one of a tightening feature tool and a hand.

7. The arbor system of claim 6, wherein said snap serration is integral part of said outside circumference.

8. The arbor system of claim 1, wherein said snap feature is a resiliently suspended snap tongue having a free end with a snap profile correspondingly shaped and positioned with respect to said snap serration for said snap interlocking with said snap serration.

9. The arbor system of claim 8, wherein said snap tongue is part of a washer sandwiched between said clamp body and said tightening feature.

10. The arbor system of claim 9, wherein said driving pin extends through and above said pin hole and interlocks with a corresponding pin fit of said washer such that said washer is positioned at least circumferentially rigid.

11. The arbor system of claim 1, wherein said snap serration has a sliding face configured for forcing said snap feature into said releasing position while said tightening feature is rotated in a free rotation direction.

12. The arbor system of claim 11, wherein said free rotation direction is a tightening direction in which said tightening feature is screwed on said first thread in direction toward said clamp body.

13. The arbor system of claim 1, wherein said snap feature is a resiliently suspended snap tongue suspending substantially inward and tangential with respect to a serration rotation path such that said snap tongue operates in conjunction with said snap serration as a ratchet having a free rotation direction and a locking rotation direction.

* * * * *